Aug. 8, 1939.　　　　　　　　　　　　　　　　　　　　　　2,169,076
S. SILVERSTEIN, NOW BY JUDICIAL CHANGE OF NAME S. BARTON
FOLDING TRAILER
Filed June 9, 1937　　　　3 Sheets-Sheet 1
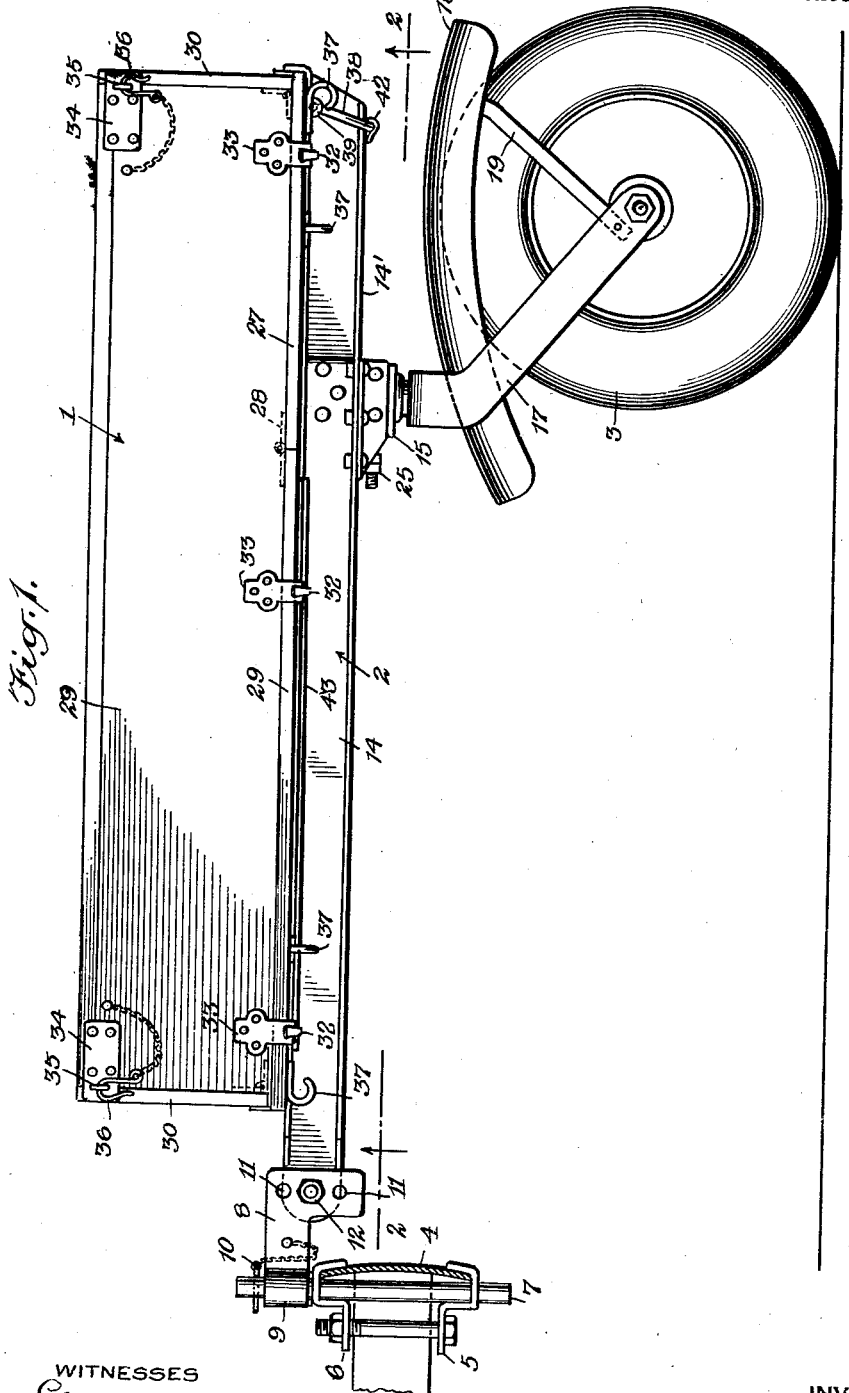
WITNESSES
　　　　　　　　　　　　　　　　　　　INVENTOR
　　　　　　　　　　　　　　　　　　　Sam Barton
　　　　　　　　　　　　　　　　　　　BY
　　　　　　　　　　　　　　　　　　　Anderson & Liddy
　　　　　　　　　　　　　　　　　　　ATTORNEYS

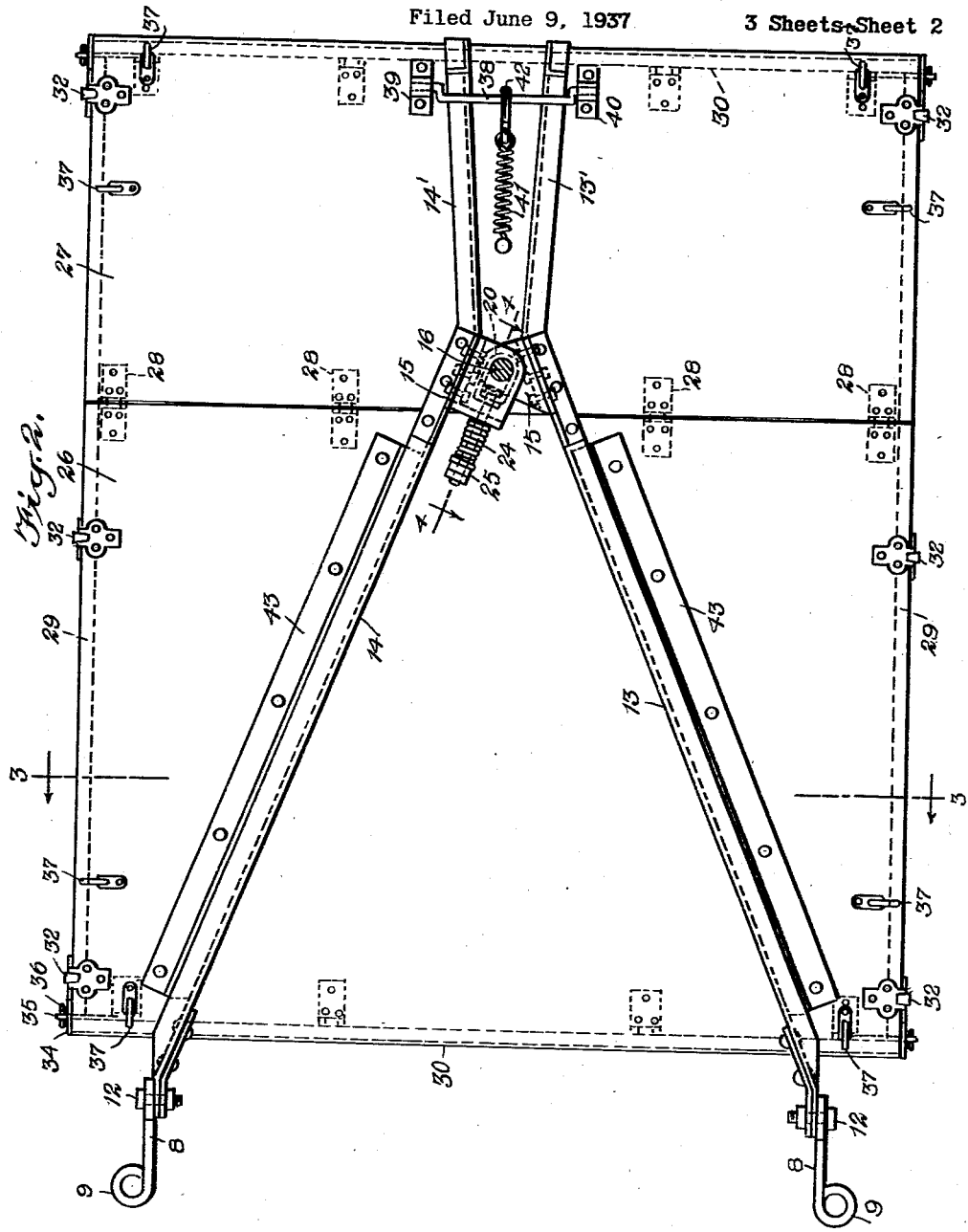

Aug. 8, 1939.  2,169,076
S. SILVERSTEIN, NOW BY JUDICIAL CHANGE OF NAME S. BARTON
FOLDING TRAILER
Filed June 9, 1937  3 Sheets-Sheet 3
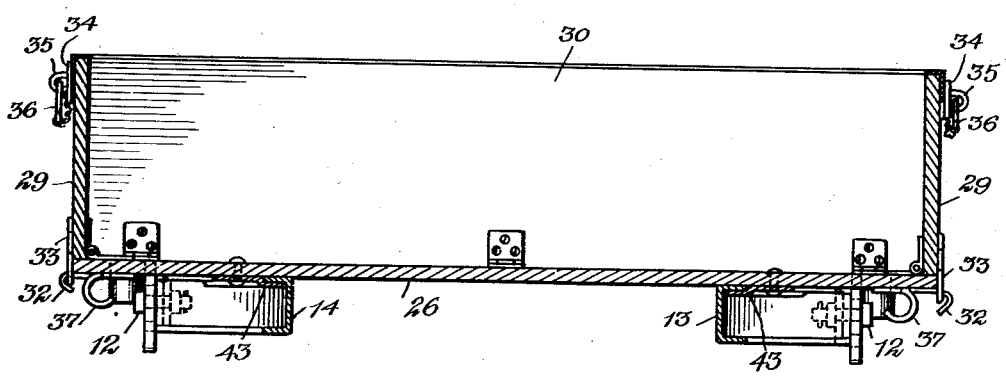
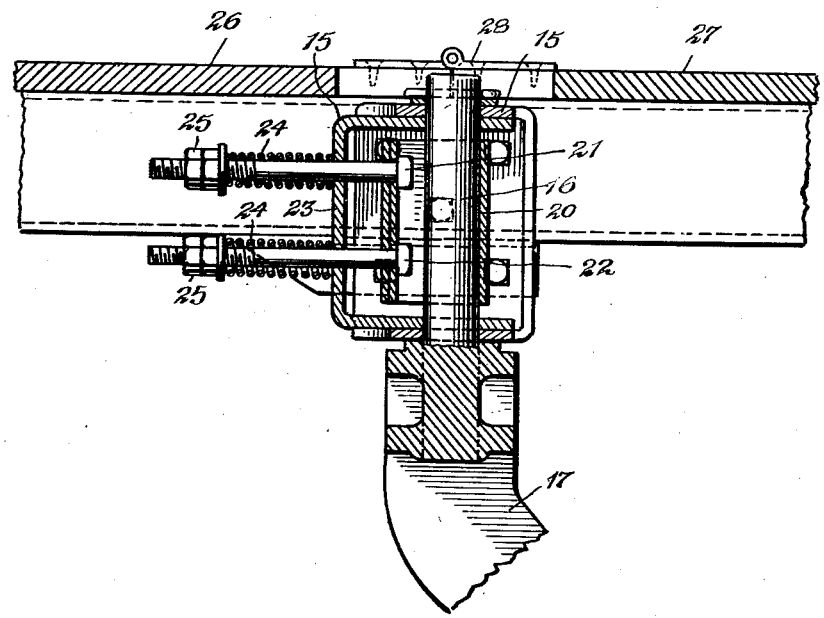

Patented Aug. 8, 1939

2,169,076

UNITED STATES PATENT OFFICE 2,169,076

FOLDING TRAILER

Sam Silverstein, New York, N. Y., now by judicial change of name Sam Barton

Application June 9, 1937, Serial No. 147,186

4 Claims. (Cl. 296—35)

This invention relates to trailers, and particularly to an improved folding trailer adapted to be easily connected or disconnected from an automobile, the object being to provide a simple strong construction that will efficiently operate without attention.

Another object of the invention is to provide a folding trailer which is so formed that one person may readily connect the same to an automobile or disconnect the same from an automobile.

An additional object, more specifically, is to provide a trailer for baggage and the like which is formed with means for limiting or preventing the bouncing of the device when in use.

A further object is to provide an improved folding trailer so constructed that it may be folded and secured readily to the rear of an automobile so as to be carried thereby.

A further object is to provide an improved folding baggage trailer so constructed that when not in use the trailer can be taken apart quickly and stored flat, requiring very little space when not in use.

In the accompanying drawings:

Fig. 1 is a side view of a folding trailer disclosing an embodiment of the invention, the same being shown connected with the rear bumper of an automobile;

Fig. 2 is a sectional view through Fig. 1 on the line 2—2 and illustrating the construction of the bottom part of the trailer;

Fig. 3 is a sectional view through Fig. 2 approximately on the line 3—3;

Fig. 4 is an enlarged detailed fragmentary sectional view through Fig. 2 on the line 4—4.

Referring to the accompanying drawings by numerals, 1 indicates the body of the trailer which is mounted on what may be called the chassis 2 supported by the wheel 3 and associated parts. The front of the chassis 2 is connected to the rear bumper 4 of an automobile. As indicated in Figs. 1 and 2, clamps 5 and 6 pinch the bumper 4 and also pinch the pin 7 which projects above the bumper and over which the fitting 8 slides. As indicated in Fig. 2 there are two fittings 8 each provided with an eye 9 adapted to rather loosely slide over the upper end of pin 7 and be prevented from removal by a suitable cotter pin 10. The fitting 8 is L-shaped as indicated in Fig. 1 and is formed with several openings 11 which may at different times receive the bolt 12 for connecting the fitting into the chassis 2. This arrangement causes the parts to properly coact with bumpers 4 at different elevations.

The chassis 2 includes a pair of swinging bars 13 and 14 which are U-shaped in cross section and which at one end carry a fitting 8 and at the other end a bracket 15. The respective brackets 15 are U-shaped as shown in Fig. 4 and also overlap sufficiently to permit the respective apertures therein to accommodate the journal pin 16. This pin connects the parts together pivotally and also acts as the journal pin for the U-shaped bracket 17 carrying wheel 3. A mudguard 18 is secured to bracket 17 and also to an auxiliary bracket 19 so as to protect the chassis 2 and body 1 from mud thrown up by wheel 3. The arrangement of the bracket 17, pin 16 and associated parts forms a caster structure whereby the wheel 3 may turn back and forth as the trailer is pulled along. In order to prevent excessive turning of wheel 3 and to slow down the motion thereof there is provided a brake mechanism to dampen or retard the action of pin 16. This brake mechanism includes a strap 20 which is overlapped at one point and through the overlapped portion the bolts 21 and 22 extend. These bolts also extend through the end plate 23 of the bracket carried by the bar 14. A spring 24 surrounds each of the bolts 21 and 22 and this spring is acted on by suitable nuts 25 to maintain the respective springs under tension whereby the bolts will pull on the strap 20 and the strap 20 will press against the pin 16. This friction may be varied by adjusting the respective bolts 25 and consequently the braking action may be varied.

The body 1 is mounted on chassis 2 in such a way as to be readily removed whenever desired. This body is made up from bottom members 26 and 27 secured together by suitable hinges 28. Side walls 29 are removably connected with the bottom members and also end members 30 are removably connected with the bottom members and with the side members. Each of the bottom members is provided with one or more clips 31 along each side edge and each of these clips is provided with a turned-over hook 32. The respective side and end walls are provided with a number of clips 33 which coact with the clips 31 and in fact are slid thereover around the hooks 32. Each of the clips 33 is provided with an aperture for accommodating a hook 32. The bars 13 and 14 and associated parts are made from metal but the bottom members 26 and 27 and also the side and end walls are preferably made from wood, although they could be made from metal or other material. As indicated particularly in Fig. 1, each of the sides is provided with what may be termed a hasp plate 34 at each end and staples 35 from the end plates 30 extend therethrough so as to receive the respective hooks 36. This will lock the parts together. In addition the bottom members 26 and 27 are provided with a number of hooks 37 designed to receive rope or other tying members for tying baggage to the trailer.

From Fig. 2 it will be seen that the bars 13 and 14 are provided with extensions 13' and 14' over which the U-shaped rod 38 is swung when the parts are being assembled. The ends of this rod are mounted in suitable journal members 39 and 40 secured to the bottom member 27. A retractile spring 41 has one end secured to the bottom member 27 and the other end acting on a hook 42 which is moved over the center of the rod 38 to resiliently hold the rod in the position shown in Fig. 2 when the device is in use. It will also be noted that when the bars 13 and 14 are swung apart to their correct position as shown in Fig. 2, one leg of the U-shaped structure of each bar will slide beneath the respective offset flanges 43 which are rigidly secured to bottom 26 as shown in Fig. 1. This will in a certain sense lock the bars 13 and 14 to the bottom member 26 while bottom member 27 is locked to the extensions 13' and 14' by the rod 38 and associated parts. Rod 38 in addition holds bars 13 and 14 in interlocked relation with the offset flanges 43. In addition the pins 7 shown in Fig. 1 are spaced a desired distance apart to also assist in holding the bars 13 and 14 spread apart or in the position shown in Fig. 2.

When the parts have been assembled fully they will appear as shown in Fig. 1 and any desired article or baggage may be placed in the body 1. If the baggage projects above the body 1, suitable tying rope may be passed thereover and over the respective hooks 37. When it is desired to remove the trailer from the car it is only necessary to pull out the respective cotter pins 10 and raise the brackets 8 until disconnected. The trailer may then be moved away to any desired point. If it should be desired to fold the trailer when storing the same or when mounting the same bodily on the back part of the automobile, the trailer is removed as just described and in addition hook 42 is disconnected. This will allow workmen to swing the bars 13' and 14' away from each other and bars 13 and 14 towards each other and out of engagement with member 43 and when this has been done the chassis is completely released from the body of the trailer. Body 1 may be taken apart by releasing the various hooks 36 and then disengaging the respective fittings 31 and 33. The wheel 3 and associated parts are preferably left in their connection with the chassis even when the parts are folded.

I claim:

1. A trailer comprising a body formed with a bottom, a pair of flange members secured to said bottom, a chassis having a pair of swinging bars adapted to be moved to an interlocked position with said flange members, means for removably holding said bars interlocked with said flange members, a caster wheel structure connected with said chassis near the rear part thereof, and means at the front for connecting the trailer with the rear part of an automobile.

2. A baggage trailer including a body having a bottom, a pair of offset flanges connected with said bottom forming a substantially V-shaped outline, a chassis formed with a pair of bars pivotally connected together, each of said bars being formed with a leg, said legs being adapted to fit beneath the respective offset flanges for connecting the chassis to the bottom of the body, means at one end of the chassis for preventing removal of the chassis from said offset flanges, and a supporting wheel structure connected with said chassis.

3. A trailer including a body, a pair of offset flanges secured to the bottom of said body, a chassis formed with a pair of pivotal bars U-shaped in cross section positioned to be swung into and out of interlocking relationship with said offset flanges, and means for locking said U-shaped bars in engagement with said offset flanges.

4. A trailer including a chassis having a pair of bars pivotally connected together intermediate their ends, said pivotal connection including a vertically positioned pin, a fork extending downwardly from the bottom of said pin, a wheel journaled on the lower end of said fork, a body, means carried by said body positioned to interlock with said bars when the bars are in functioning position and means for normally locking said bars in functioning position.

SAM SILVERSTEIN.